United States Patent
Koshiishi et al.

(10) Patent No.: US 6,938,324 B2
(45) Date of Patent: Sep. 6, 2005

(54) METHOD OF MANUFACTURING A STATOR CORE

(75) Inventors: Hiromichi Koshiishi, 5-25, Minamiyachiyomachi, Yahatanishi-ku, Kitakyushu-shi, Fukuoka-ken (JP); Tomiya Ogata, Kitakyushu (JP); Shigeki Eguchi, Munakata (JP); Hideo Hasegawa, Sakura (JP)

(73) Assignees: Toyo Tessin Kogyo Co., Ltd., Chiba-Ken (JP); Nobunaga Iijima, Tokyo-Ku (JP); Hi-Z Co., Ltd., Fukuoka-Ken (JP); Hiromichi Koshiishi, Fukuoka-Ken (JP)

( * ) Notice: Subject to any disclaimer, the term of this patent is extended or adjusted under 35 U.S.C. 154(b) by 0 days.

(21) Appl. No.: 10/688,929

(22) Filed: Oct. 21, 2003

(65) Prior Publication Data

US 2004/0135459 A1 Jul. 15, 2004

(30) Foreign Application Priority Data

Jan. 14, 2003  (JP) ................................ P2003-005840
Apr. 10, 2003  (JP) ................................ P2003-106674
Sep. 1, 2003   (JP) ................................ P2003-309297

(51) Int. Cl.$^7$ ........................ H02K 15/00; H02K 15/14; H02K 15/16
(52) U.S. Cl. .................... 29/596; 29/602.1; 29/609; 148/111; 148/306; 148/307; 148/310; 310/216; 420/87; 420/119
(58) Field of Search ............................... 29/596, 602.1, 29/609; 148/111, 306, 307, 310; 310/216; 420/87, 119

(56) References Cited

U.S. PATENT DOCUMENTS 4,268,325 A  *  5/1981 O'Handley et al. ........ 148/108
4,602,969 A  *  7/1986 Koshiishi et al. ........... 148/121
5,108,522 A  *  4/1992 Nishimoto et al. ......... 148/111
5,942,051 A  *  8/1999 Takashima et al. ........ 148/111
6,011,475 A  *  1/2000 Herzer ....................... 340/572.6
6,743,304 B2 *  6/2004 Kawamata et al. ........ 148/306

FOREIGN PATENT DOCUMENTS

| JP | 7-145455 | 6/1995 | |
| JP | 9-20969 | 1/1997 | |
| JP | 9-143640 | 6/1997 | |
| JP | 10-317091 | 12/1998 | |
| JP | 11-340030 | * 12/1999 | ............. H01F/7/06 |
| JP | 11-341749 | 12/1999 | |
| JP | 2002-146490 | 5/2002 | |
| WO | 99/24950 | 5/1999 | |

* cited by examiner

Primary Examiner—Carl J. Arbes
Assistant Examiner—Tim Phan
(74) Attorney, Agent, or Firm—Wenderoth, Lind & Ponack, L.L.P.

(57) ABSTRACT

A motor stator core for achieving improved magnetizing feature in lower magnetic fields and reduced iron loss, and improving motor power. The stator core fabriated out of non-oriented electrical steel sheets is annealed by applying a magnetic field to the heated stator core at least in the temperature range from a temperature immediately above a Curie point thereof to 300° C. in the process of cooling the stator core. The magnetic field has the same direction as the direction of exitation of a stator in the motor when used to drive a motor. This increases the magnetic induction in lower magnetic fields in particular and reduces the hysteresis loss, with a reduction in the total iron loss of the stator. A motor using this stator core increases in saturation induction under exciting currents of higher frequncies, allowing enhanced motor power.

16 Claims, 5 Drawing Sheets

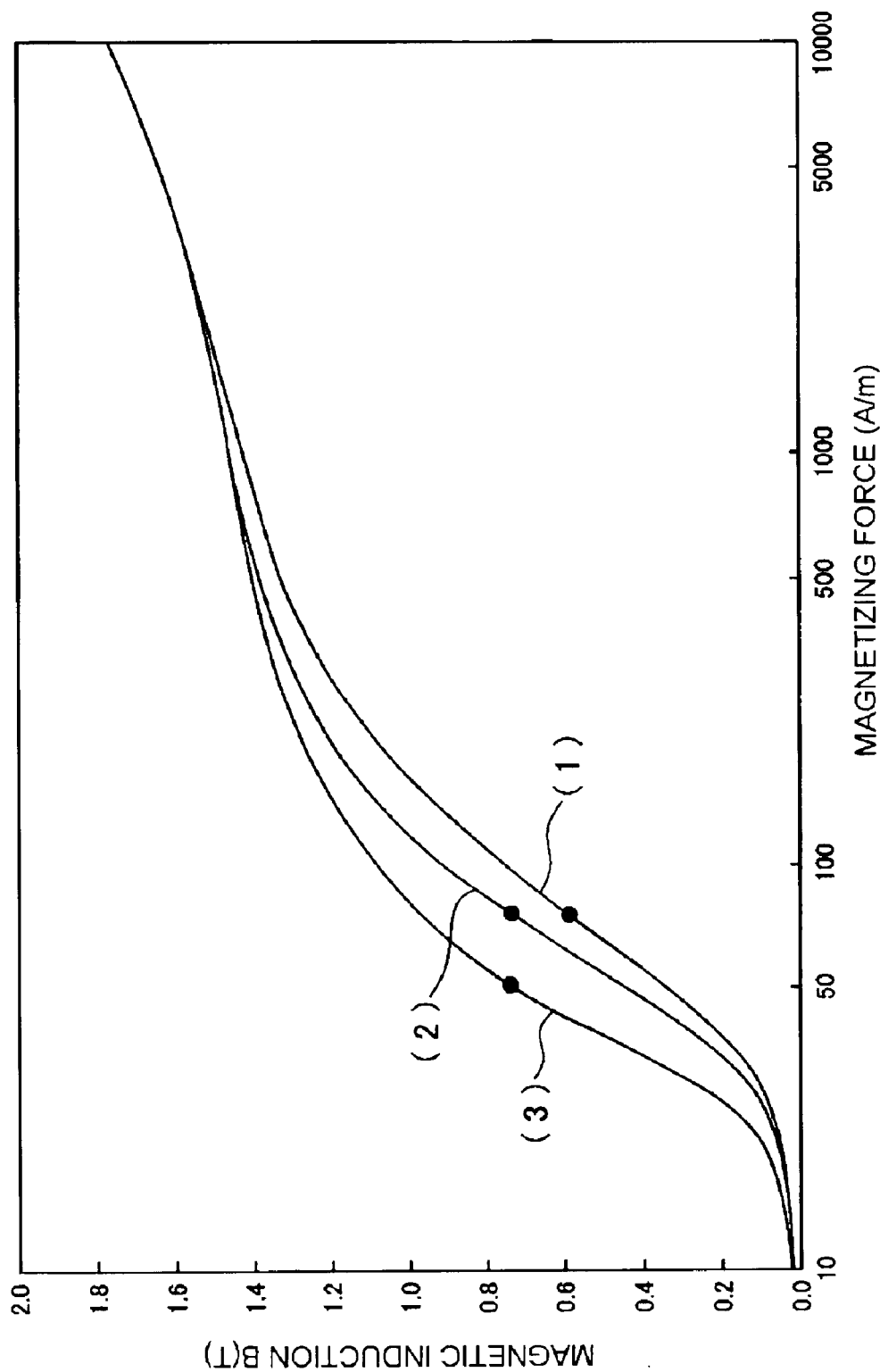

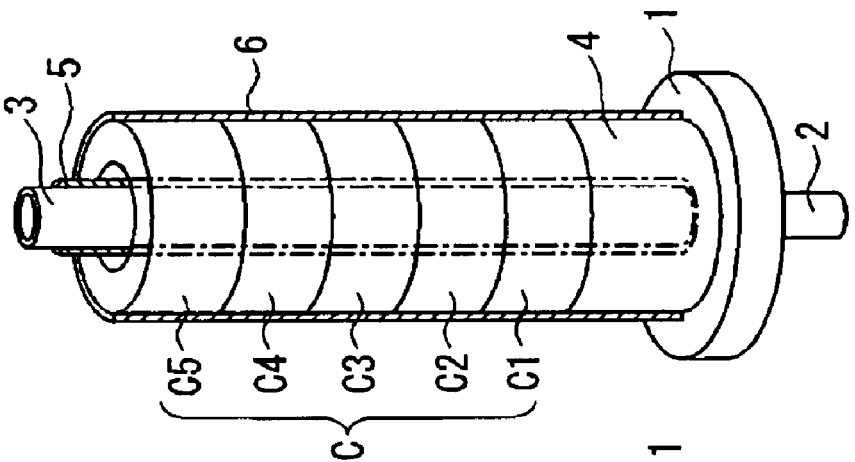
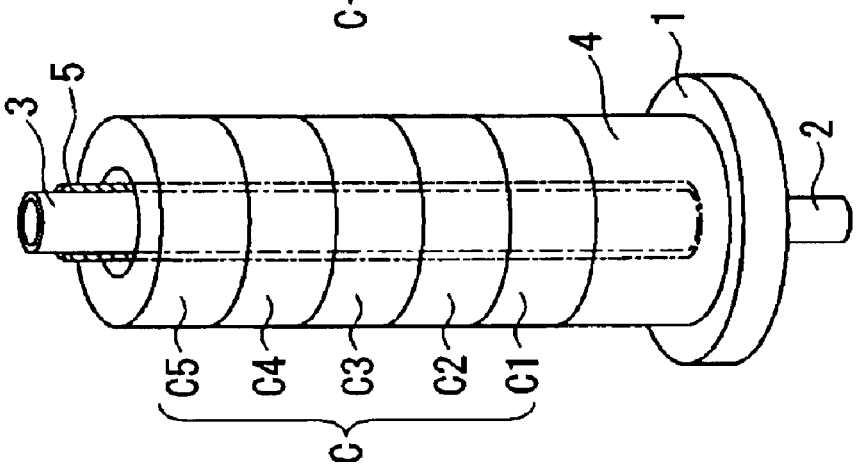
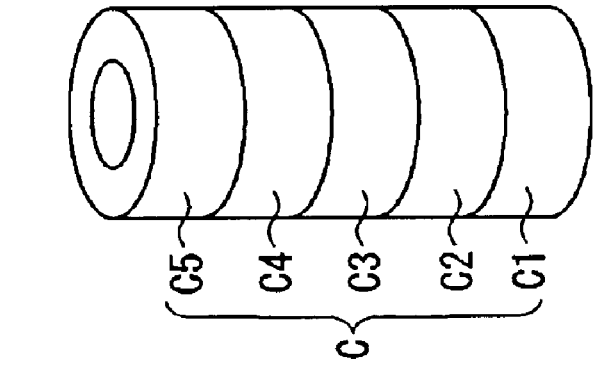
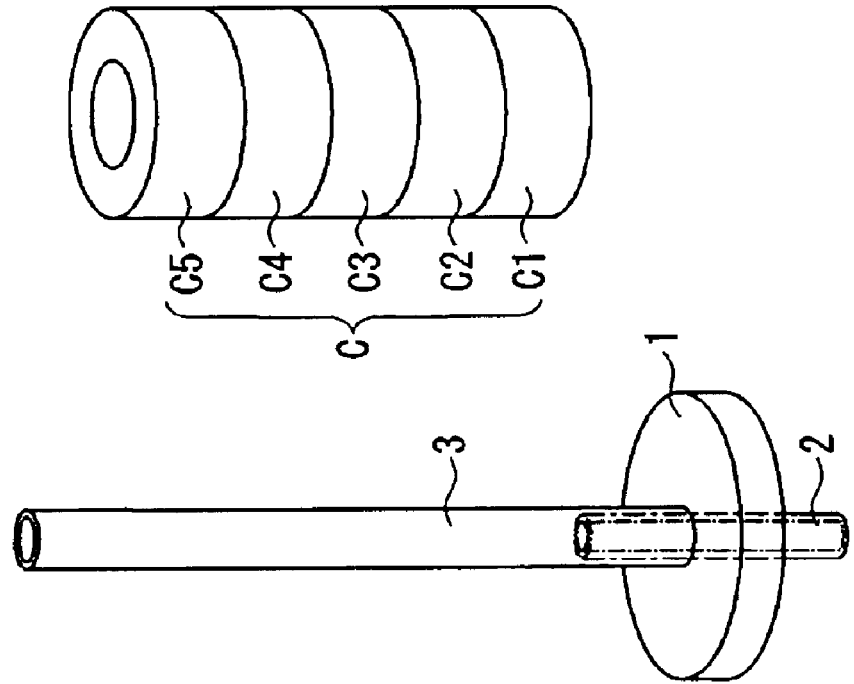

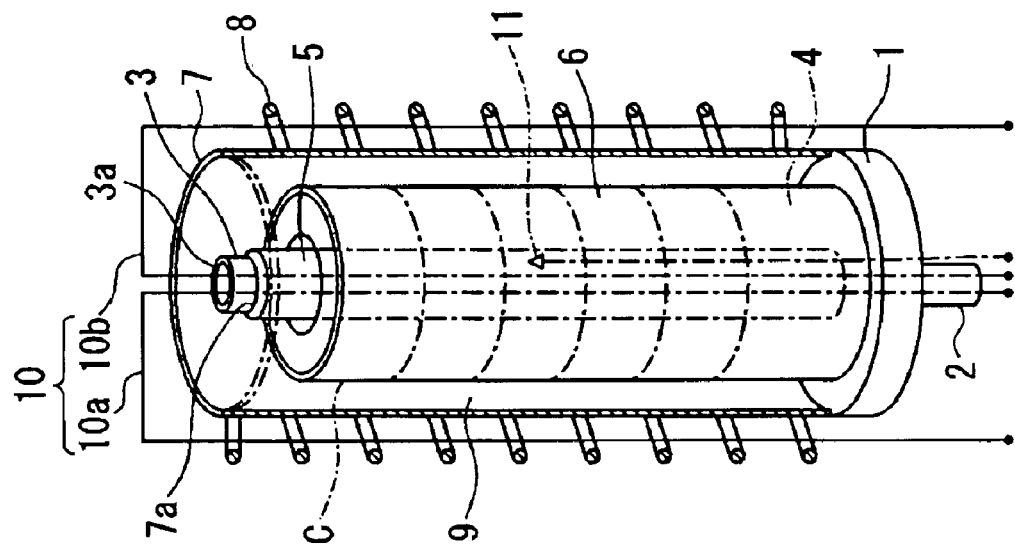
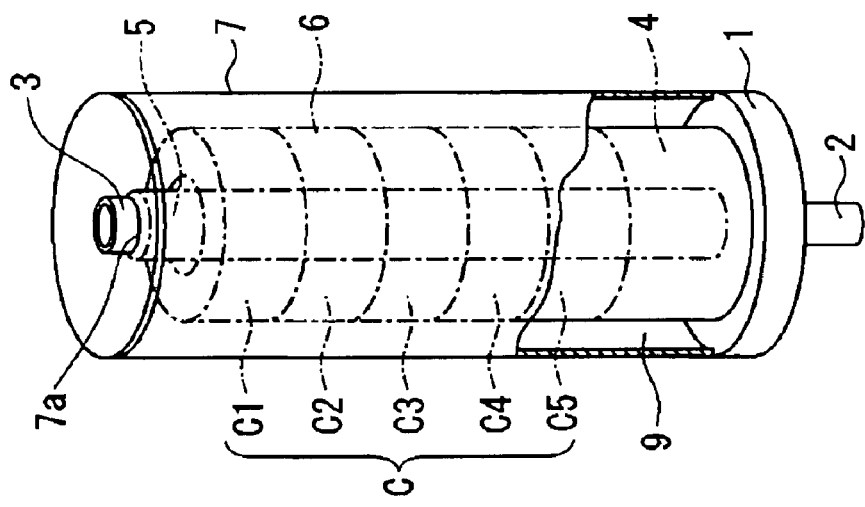

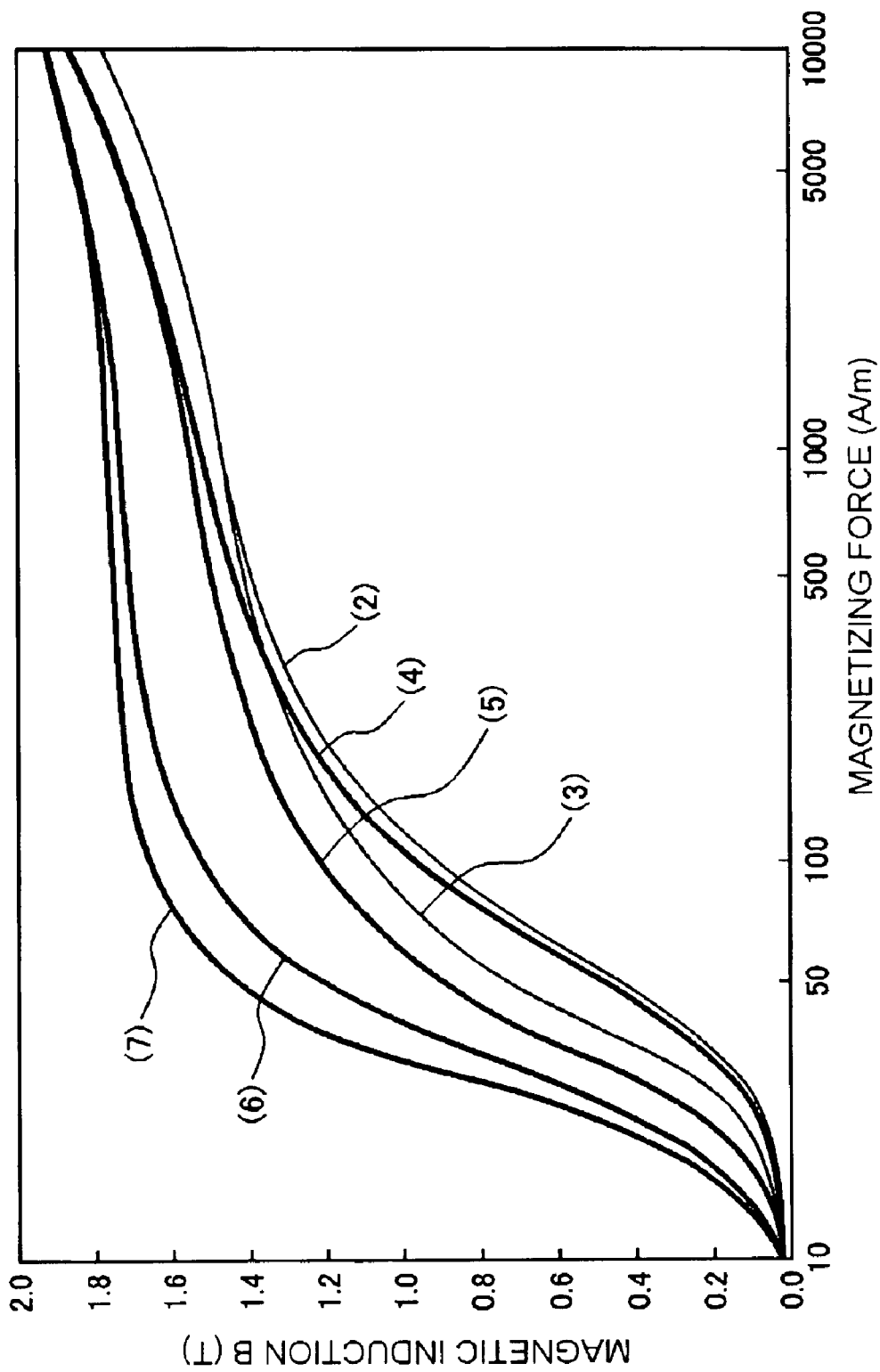

METHOD OF MANUFACTURING A STATOR CORE

BACKGROUND OF THE INVENTION

This application claims the benefit of Japanese Patent Application No. 2003-005840, filed on Jan. 14, 2003; Japanese Patent Application No. 2003-106674, filed on Apr. 10, 2003; and Japanese Patent Application No. 2003-309297, filed on Sep. 1, 2003.

1. Field of the Invention

The present invention relates to a motor stator core made of non-oriented electrical steel sheets. In particular, the invention relates to a motor stator core of improved magnetizing feature in lower magnetic fields and a method of manufacturing the same.

2. Description of the Related Art

Recently, in view of environmental and resources problems, energy savings and improved efficiency have been increasingly demanded of electric equipment. The biggest request for motors is also an efficiency improvement, which in turn requires reductions of iron loss, copper loss, and mechanical loss. Such motors use a lamination of non-oriented electrical steel sheets for their core. It is well known that the core has a large impact on iron loss.

Motor cores are made of non-oriented electrical steel sheets, which are manufactured through the application of cold rolling, including one or more processes of annealing, to hot-rolled steel sheets that are adjusted to predetermined chemical compositions. Some of the manufacturing steps vary between semi-processed non-oriented electrical steel sheets and full-processed non-oriented electrical steel sheets. Semi-processed non-oriented electrical steel sheets are predicated on the application of stress-relief annealing after punching. The cold-rolled steel sheets are thus annealed at relatively low temperatures for a short time. The annealing also includes skin passed rolling in its final step. In contrast, full-processed non-oriented electrical steel sheets are not necessarily predicated on the stress-relief annealing of the core. The cold-rolled steel sheets are thus annealed at higher temperatures for a longer time than the semi-processed non-oriented electrical steel sheets are. To ease this annealing condition, the hot-rolled steel sheets are sometimes annealed.

By the way, the design concept of high-speed high-efficiency motors typified by electric vehicle motors, which are under intensive development and commercialization recently, is toward higher frequencies (400 to 600 Hz) and lower magnetic induction (1.0 to 0.5 T). A further improvement for lower iron loss is thus required of non-oriented electrical steel sheets, or motor core material, accordingly.

Motor power P is expressed by the following general equation:

$$P = k \times f \times N \times i \times B \times S,$$

where k is a proportionality constant, f is a frequency, N is the number of windings, i is a current, B is a magnetic induction, and S is the sectional area of the core. From the foregoing equation, it is first shown that with consideration given to the miniaturization and weight reduction of the motor, the power P may be increased by raising the frequency f of the exciting current. Frequencies as high as 10 times or so the frequencies of commercial power sources are available recently owing to the invention of inverters. For this reason, the frequency f and the magnetic induction B have been evaluated for optimum solutions in the range of frequencies higher than those of the conventional commercial power sources. The feasible range of magnetic induction B at a given frequency f depends on the occurrence of anti-magnetizing force from the motor core material, or the non-oriented electrical steel sheets. Consequently, the frequency f is typically set within the range from 400 to 600 Hz, and the magnetic induction B the range from 1.0 to 0.5 T. In such numerical ranges, the magnetic induction B remains at a decreasing rate of ½ or so for 8× to 10× frequencies f. This promises a power increase of the order of f×B=4 to 5 times. The numerical ranges of the values k, N, i and S in the foregoing equation are automatically determined once the frequency f and the magnetic induction B are determined.

The iron loss W of a non-oriented electrical steel sheet, or motor core material, is expressed as:

$$W = Wh + We,$$

where Wh is hysteresis loss which is given by $$Wh = k1 \times f \times B^{1.6},$$

We is eddy current loss which is given by $$We = k2 \times (t^2 \times f^2 \times B^2)/\rho, \text{ and}$$

k1 and k2 are constants, t is a thickness, and ρ is a resistivity.

For the sake of reduction in this iron loss, steel sheets have been reduced in thickness and increased in resistivity. Some of the most excellent non-oriented electrical steel sheets at present have thicknesses t as small as 0.20 mm or so and resistivities as high as or above 55 μΩ-cm.

As a result of these measures for reducing iron loss by means of reduced thicknesses and increased resistivities, non-oriented electrical steel sheets have been considerably reduced in iron loss as compared to heretofore. Nevertheless, the reduction in iron loss resulting from the reduced thickness and increased resistivity of the electrical steel sheets is ascribable to a reduction of the eddy current loss out of the iron loss expressed by the foregoing equation. The hysteresis loss is not reduced by a reduction in thickness or an increase in resistivity. As the eddy current loss decreases, the ratio of the hysteresis loss to the entire iron loss increases relatively from conventional 70% or so to 90% or so. For future measures for a reduction in iron loss, it is thus becoming increasingly important to reduce the hysteresis loss.

The hysteresis loss of an electrical steel sheet has a close relationship with magnetic induction, and magnetizing feature can be improved to reduce the hysteresis loss. Consequently, improvement in the magnetizing feature matters for the sake of a reduction in hysteresis loss. The magnetizing feature can be improved by making the crystal direction of an electrical steel sheet to be a random cubed direction. For concrete means, one of the inventors has developed a non-oriented electrical steel sheet which is switched from a conventional Si-rich composition to an Al—Mn rich composition to achieve both reduced iron loss and improved magnetizing feature (see Unexamined Japanese Patent Publication No. 2002-146490).

To fabricate a typical motor core, hoops of non-oriented electrical steel sheets oiled with punching oil are press-punched into a predetermined shape, and then a lamination of the resultant is firmly bonded by clumping or welding. Subsequently, heat treatment is performed to remove the adhering punching oil, followed by annealing.

The primary purpose of this annealing is to remove strains occurring at the time of punching as well as to promote the growth of crystal grains for improved magnetizing feature. It is semi-processed non-oriented electrical steel sheets that are predicated on the application of this stress-relief annealing to the core after punching. Conventionally, motor cores have been annealed under the condition that they are kept in a non-oxidizing or reducing atmosphere at soaking temperatures of approximately 750° C. for approximately 2 hours. Recently, it has been proposed to perform this kind of core annealing in a magnetic field. For example, Unexamined Japanese Patent Publication No. Hei 11-340030 describes a method in which the electrical steel pieces of a core to be excited in two or more directions inside are annealed in magnetic fields having the same directions as the directions of their excitation. Moreover, Unexamined Japanese Patent Publication No. Hei 11-341749 describes a method of annealing a core under the application of a magnetic field, wherein the magnetic field to be applied to the core is caused by a coil, and the core is heated for annealing by the heat generated by the coil or through the application of a high-frequency magnetic field from the coil.

The technology for applying heat treatment to metal in a magnetic field has been studied long. Even with Fe—Si alloys, however, it has been concluded in the 1960s that "heat treatment in a magnetic field has been developed for the purpose of improving Fe—Si alloys' permeability and produced excellent outcomes in laboratories, but of little practical value since it requires a lot of work and cost." No practical use has thus been attempted so far.

Nevertheless, it is highly probable that annealing a motor stator core, or a subject matter of the present invention, in a magnetic field can improve magnetizing feature. Under the present circumstances, however, the relationship of the material properties and annealing condition to the magnetizing feature of the annealed core has not been clarified. Moreover, the magnetic annealing of a core proposed in the foregoing Unexamined Japanese Patent Publications Nos. Hei 11-340030 and Hei 11-341749 has made no reference in this regard. The inventors have also filed a patent application for a method and apparatus for annealing a motor stator core in a magnetic field as Japanese Patent Application No. 2002-156136, whereas this prior application has not provided sufficient resolution in this regard.

As described above, electric vehicle motors are currently adopting exciting currents of higher frequencies in the frequency range from 400 to 600 Hz to provide power higher than with the exciting currents of commercial power frequencies. Nevertheless, an increase in the frequency of the exciting current can lower the stator cores to ½ or so, or even below, in magnetic induction. Here, if the stator cores can be prevented from dropping in magnetic induction even under exciting currents of higher frequencies, it is possible to expect a further enhancement to the power of the electric vehicle motors at present, or a miniaturization of the same.

SUMMARY OF THE INVENTION

It is an object of the present invention to ascertain the relationship of material properties and annealing conditions to the magnetizing feature of motor stator cores annealed when magnetic annealing is performed on the stator cores which are fabricated out of conventional Si-rich non-oriented electrical steel sheets as well as Al-rich non-oriented electrical steel sheets having more favorable magnetizing feature or, in particular, the stator cores for use in electric vehicle motors to be driven in lower magnetic fields, and to provide a motor stator core for achieving improved magnetizing feature and reduced iron loss in lower magnetic fields and a method of manufacturing the same.

The motor stator core according to the present invention is a stator core for use in a motor to be driven in a lower magnetic field of 1.0 T or less in magnetic induction. The stator core is made of non-oriented electrical steel sheets and annealed with a magnetic field applied thereto at least in the process of cooling from a temperature immediately above a Curie point thereof. The magnetic field has the same direction as that of excitation of a stator in the motor when used to drive the motor.

The method of manufacturing a motor stator core according to the present invention comprises: a stator core fabrication step of fabricating a stator core out of non-oriented electrical steel sheets; and a stator core annealing step of heating the fabricated stator core to a temperature above a Curie point thereof, and then cooling the stator core while applying a magnetic field to the stator core at least in the temperature range from a temperature immediately above the Curie point to 300° C. in the cooling process after the heating. The magnetic field has the same direction as that of excitation of a stator in the motor when used to drive the motor. Here, the stator core desirably has a grain size of 100 μm or greater at the time of application of the magnetic field.

In annealing the stator core fabricated out of the non-oriented electrical steel sheets, the magnetic field is applied to the heated stator core at least in the temperature range from the temperature immediately above the Curie point to 300° C. in the process of cooling the stator core. A stator core of reduced iron loss can thus be manufactured as one for use in a high-speed high-efficiency motor typified by an electric vehicle motor to be driven in lower magnetic fields. In particular, if the direction of the magnetic field applied to the stator core in the cooling process is rendered along the direction of excitation of the stator when used to drive a motor, it follows that the directions of magnetization of the domains in the crystals of the stator core approach the direction of excitation of the stator for motor driving. Consequently, the domains of the stator core are easily oriented in the direction of excitation when the stator is excited. This increases the magnetic induction and decreases the hysteresis loss, allowing a reduction in the total iron loss of the stator. Since the directions of magnetization of the domains in the crystals of the stator core approach the direction of excitation of the stator for motor driving, the stator core is prevented from dropping in magnetic induction when under high-frequency exciting currents of 400 to 600 Hz which are used in electric vehicle motors. Besides, the saturation induction is increased. It is therefore possible to achieve a further power improvement or miniaturization of the motor that uses this stator.

Moreover, since the stator core is given a grain size of 100 μm or greater at the time of application of the magnetic field, the domains in the crystals annealed in the magnetic field become easier to orient in the same direction of magnetization with a further improvement to the effect of improving the magnetizing feature.

The nature, principle, and utility of the invention will become more apparent from the following detailed description when read in conjunction with the accompanying drawings in which like parts are designated by identical reference numbers.

BRIEF DESCRIPTION OF THE DRAWINGS

FIG. 1 is a graph for explaining the effect of the present invention in conjunction with B-H curves;

FIGS. 2A to 2D are schematic diagrams showing the steps of annealing a stator core according to an embodiment of the present invention;

FIGS. 3A and 3B are schematic diagrams showing the steps of annealing the stator core according to the embodiment of the present invention;

FIG. 4 is a graph showing experimental results; and

DETAILED DESCRIPTION OF THE PREFERRED EMBODIMENT

Figure 5:
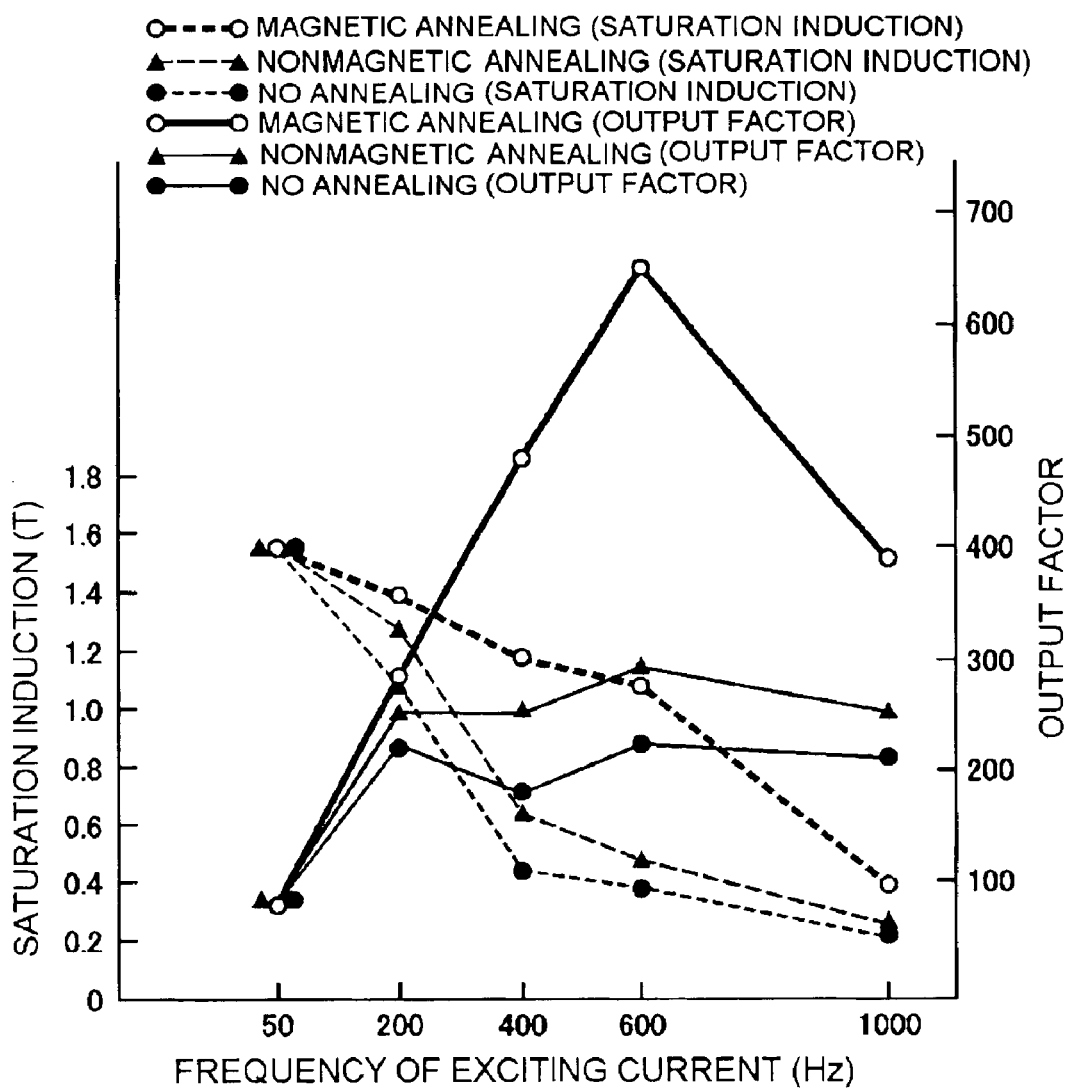
FIG. 5 is a graph showing experimental results.

Ordinary motors are typically used in commercial power frequencies at magnetic induction of the order of 1.4 to 1.8 T. The stator cores of the motors to be driven under such high fields do not have much margin for improving their magnetizing feature through the annealing of the stator cores, nor for improving magnetic induction through magnetic annealing. That is, the magnetic annealing promises little effect. With the stator cores of motors to be driven under lower magnetic fields of 1.0 T or less in magnetic induction, in contrast, the magnetic annealing provides a significant effect if the cores are annealed under an appropriate condition of field application. In this respect, description will be given with reference to FIG. 1.

FIG. 1 shows a graph called a B-H curve which shows the relationship between magnetizing force H and magnetic induction B. The magnetizing force H on the abscissa indicates the intensity of an electric current, which is the force for magnetization, in terms of a total current per meter in units of A/m. The magnetic induction B on the ordinate indicates, in units of T (tesla), up to how many magnetic lines of force can be absorbed for a given magnetizing force H. In the graph, the curve (1) shows measurements on a sample that is made of electrical steel sheets, or the material, as punched. The curve (2) shows measurements on the sample of(1) that has been annealed without any magnetic field. The curve (3) shows measurements on the sample of (1) that has been magnetic-annealed. The material was commercially available Si-rich non-oriented electrical steel sheets (equivalent of JIS C2552 35S230), having a thickness of 0.35 mm. The steel sheets were punched into a ring shape having an outer diameter of 80 mm and an inner diameter of 60 mm. The heating temperature at the time of annealing was 750° C. The magnetic field was applied in the process of cooling from 750° C. to 300° C.

As can be seen from FIG. 1, a difference between non-magnetic annealing and magnetic annealing (the distance between the curves (2) and (3)), i.e., the effect of the magnetic annealing, is small in the area where the magnetic induction B is 1.4 to 1.8 T, which is the driving condition for ordinary motors. Now, in the area of lower magnetic fields where the magnetic induction B is 1.0 T or lower, which is the driving condition for electric vehicle motors, the magnetic annealing provides an extremely high effect. The B-H curve rises at a sharp angle in the case of the magnetic annealing in particular. The point of the maximum permeability (indicated with a solid circle on the graph) shifts toward lower magnetizing forces, with a significant improvement to the magnetizing feature in lower magnetic fields.

The stator core itself is composed of crystals each containing a plurality of magnetic domains. The domains disappear at temperatures above the Curie point (for example, approximately 720° C. in the case of Si-rich non-oriented electrical steel sheets) when the stator core is annealed, and reappear when cooled to temperatures below the Curie point. When a magnetic field is applied in the cooling process, most of the plurality of domains that reappeared are oriented with their directions of magnetization along the direction of the magnetic field applied. Subsequently, the application of the magnetic field is stopped at 300° C., so that the directions of magnetization of the respective domains are fixed, in principle, to the direction of a magnetic easy axis (any one of crystal axes [100], [010], and [001]) that is three-dimensionally closest to the direction of the magnetic field applied so far. As a result, higher magnetic induction is obtainable at lower magnetic fields. That is, the point of the maximum permeability shifts toward lower magnetizing forces.

Moreover, if the direction of the magnetic field applied to the stator core in the cooling process is rendered along the direction of excitation of the stator for motor driving, it follows that the directions of magnetization of the domains fixed at 300° C. as described above approach the direction of excitation of the stator for motor driving. This facilitates orienting the domains of the stator core to the direction of excitation of the excited stator, allowing an increase in magnetic induction. Consequently, the hysteresis loss decreases to reduce the total iron loss of the stator, and the motor using this stator core increases in saturation induction under exciting currents of higher frequencies. As a result, the motor power improves.

The application of the magnetic field in the cooling process is preferably performed in the temperature range from a temperature immediately above the Curie point to 300° C. At temperatures higher than immediately above the Curie point, the application of the magnetic field has no effect since the domains in the crystals of the stator core disappear in this temperature range. Experiments have found that the temperature at which the directions of the domains reappearing in the cooling process are fixed to a certain direction under the application of a magnetic field is around 300° C. Thus, the magnetic field need not be applied at temperatures lower than that.

The magnetic field to be applied preferably has an intensity of 800 to 12000 A/m. The reason is that at magnetic field intensities below 800 A/m, the effect of improving the magnetizing feature resulting from the application of the magnetic field is small and unstable. On the other hand, even if a magnetic field higher than 12000 A/m is applied, the effect of improving the magnetizing feature reaches saturation.

For further enhancement the effect of the magnetic annealing, the stator core desirably has a grain size of 100 $\mu$m or greater at the time of field application. The greater grain size the stator core has upon field application, the smaller the total area of the grain boundary becomes. The domains after the magnetic annealing thus become easier to orient in the same direction of magnetization with a corresponding improvement in the magnetizing feature. Then, the stator core desirably has a grain size as great as possible, at least at the point in time when the magnetic field is applied at the temperature immediately above the Curie point. In particular, grain sizes of 100 $\mu$m or greater enhance the effect of the field application. It is therefore desirable that the stator core itself at the time of field application be given a greater grain size by either of the following means: fabricating the stator core by using non-oriented electrical steel sheets having a grain size of 100 $\mu$m or greater (such as equivalents of JIS C2552 35S230); and fabricating the stator core by using non-oriented electrical steel sheets having a grain size below 100 $\mu$m (such as equivalents of JIS C2552 35S300) and heating the stator core to around 850–900° C. in an $H_2$ or (H₂+Ar) atmosphere for grain growth. In the case of the stator core that is made of non-oriented electrical steel sheets of 100 μm or greater in grain size, the heating up to the temperature immediately above the Curie point may be immediately followed by the field application and cooling. On the other hand, in the case of the stator core that is made of non-oriented electrical steel sheets of below 100 μm in grain size, the crystal grains are preferably grown in the foregoing manner before the magnetic field is applied thereto in the cooling process. For example, when the stator core is made of non-oriented electrical steel sheets that have been given skin passed rolling in the final step of fabrication, the crystal grains of the stator core can grow to a grain size of 200 μm or so when the stator core is heated for annealing.

This annealing of the stator core accompanied with field application can be affected, for example, by using an annealer that is described in Japanese Patent Application No. 2002-156136. This annealer is a stator-core annealer comprising a seat, a pipe member, a cover, a spiral winding coil, and linear coils. The seat is intended to stack a plurality of stator cores thereon. The pipe member is attached to an axial rod of the seat, and the stator cores stacked with the pipe member passed through their through holes. The cover shields the internal and external surfaces of the stacked stator cores from ambient air. The winding coil is arranged outside the cover. The linear coils are arranged linearly along the bore surface and peripheral surface of the stacked stator cores.

[Embodiment 1]

FIGS. 2A to 3B are schematic diagrams showing the steps for annealing a stator core according to the embodiment of the present invention. The shown steps are of processing prior to the start of annealing.

FIG. 2A shows a seat 1, an axial rod 2, and a pipe member 3 for stacking stator cores (hereinafter, referred to as cores) C to be annealed. The pipe member 3 is a heat-resistant silica tube. FIG. 2B shows five cores (C1 to C5). In the present embodiment, each of the cores C is a lamination of non-oriented electrical steel sheet layers as material which have been punched in a ring shape. Each core has an outer diameter of 300 mm, an inner diameter of 200 mm, and a thickness of 200 mm. The height of the five cores stacked is 1000 mm.

FIG. 2C shows the five cores C stacked. In the diagram, the reference numeral 4 represents a core mount, and 5 a heat insulator of alumina wool which is wound around the pipe member 3. The five cores C are stacked on the core mount 4 which is placed on the seat 1. The inner peripheries of the cores C and the outer periphery of the heat insulator 5 have a gap of the order of 10 mm therebetween.

FIG. 2D shows the stacked cores C with a heat insulator 6 of alumina wool wound around. The heat insulator 6 is wound around the pipe member 3 and the cores C for the purpose of providing heat insulation when the cores C are heated by a winding coil 8 for heating the stacked cores C to be described later, and when they are cooled off.

FIG. 3A shows the state where a cover 7 for shielding against ambient air is installed. The cover 7 is an open-bottom cylindrical member having a hole 7a for the pipe member 3 to pass through in its top. With the cover 7 arranged over the stacked cores C (including the heat insulator 6), the gap between the cover 7 and the seat 1 can be sealed so that the cores C are shielded from the ambient air. Atmospheric gas such as inert gas, non-oxidizing gas, and non-nitriding gas is supplied to a space 9 between the outer peripheries of the cores C and the inner periphery of the cover 7 through a hole (not shown) which is formed in the seat 1.

FIG. 3B shows the layout of a heating coil and field applying coils. A winding coil 8 for heating the cores C is arranged outside the cover 7. In the present embodiment, the winding coil 8 is a spirally wound coil of water-cooling copper pipe. When energized with a high-frequency current of 500 Hz, the winding coil 8 heats the cores C to 750–850° C.

Two linear coils 10 (10a, 10b) are arranged across outside the cover 7 and inside a hole 3a of the pipe member 3 at the center of the cores C. The linear coils 10 are intended to apply a magnetic field to the cores C during cooling. In the present embodiment, copper wire coils capable of applying a 12000-A/m magnetic field are used. The winding coil 8 and the linear coils 10 described above can be moved upward, and thus are retracted upward when the cores C, the cover 7, and the like are mounted and dismounted onto/from the seat 1.

Next, description will be given of the method of annealing a motor stator core by using the annealer which has the basic structure shown in FIG. 3B.

The cores C, the cover 7, and others are loaded on the seat 1 as shown in FIG. 3B. Atmospheric gas (for example, Ar gas) is supplied to the space 9 between the outer peripheries of the cores C and the inner periphery of the cover 7. After the winding coil 8 and the linear coils 10 are arranged in predetermined positions, the winding coil 8 is energized with a high-frequency current of 500 Hz from a high-frequency power supply (not shown) so that the cores C are heated to 750–850° C. The non-oriented electrical steel sheets, or the material of the motor stator cores, have a Curie point of approximately 720° C., provided that they are Si-rich. Heating the cores C to 750–850° C. thus removes strains occurring in punching the steel sheets, and provides the effect of improving the magnetizing feature through the growth of crystal grains in the material. In particular, the effect of improving the magnetizing feature due to field application is significant when the material has a grain size of 100 μm or greater. If the material has a grain size below 100 μm, it is thus preferable to heat the material to 850–900° C. so that a grain size of 100 μm or greater is achieved. Incidentally, when the material is non-oriented electrical steel sheets that have been given skin passed rolling in the final step of fabrication, the crystal grains of the cores C can grow to a grain size of 200 μm or so when the cores C are heated for annealing.

A thermometer 11 is used to confirm, from its temperature detection value, that the internal temperature of the cores C reaches 750–850° C. Then, the heating by the winding coil 8 is stopped to cool the cores C. After the start of cooling, at the point that the internal temperature of the cores C falls to approximately 750° C., the linear coils 10 are energized with DC currents of 12000 A/m from a DC power supply (not shown) so that the magnetic field is applied to the cores C. The cooling accompanied with the field application is continued until the internal temperature of the cores C falls to approximately 300° C. Below 300° C., the field application is stopped for natural cooling.

In this cooling process, a plurality of domains in the crystals of the cores C reappear which have disappeared due to heating to the Curie point and over. Because of the field application in the cooling process, most of the plurality of domains reappearing are oriented with their directions of magnetization along the direction of the magnetic field applied. Subsequently, when the application of the magnetic field is stopped at 300° C., the directions of magnetization of the respective domains are fixed to the direction of a magnetic easy axis (any one of crystal axes [100], [010], and

[001]) that is three-dimensionally closest to the magnetic field applied so far. Consequently, high magnetic induction is obtainable in lower magnetic fields.

In addition, the linear coils 10 for field application are arranged as shown in FIG. 3B so that the direction of the magnetic field applied coincides with the direction of excitation of the stator for motor driving. The directions of magnetization of the domains are thus fixed close to the directions of excitation of the stators for motor driving. Consequently, the domains of the stator cores are easily oriented in the direction of excitation when the stators are excited for motor driving. This allows an increase in magnetic induction and a decrease in hysteresis loss, with a reduction in the total iron loss of the stators. The motors using these stator cores also improve in power under exciting currents of high frequencies.

The following experiments were conducted to confirm the effects of the present invention.

EXPERIMENTAL EXAMPLE 1

(Experimental Condition)

Used material: non-oriented electrical steel sheets (sample symbol: HTH1500)

0.20 mm in thickness, no skin passed rolling, 60 µm in grain size

Sample dimensions: 80 mm in outer diameter, 60 mm in inner diameter

Heating temperature: 850° C., 750° C.

Field application: in the process of cooling from 750° C. to 300° C.

Field intensity: 0 (nonmagnetic annealing), 800, 6000 (A/m)

(Experimental Results)

Table 1 shows the experimental results.

TABLE 1

| Annealing condition | Field intensity (A/m) | B0.5 (T) | W7/50 (W/kg) | Grain size (µm) |
|---|---|---|---|---|
| Heating temperature 850° C. | 6000 | 0.726 | 0.469 | 70 |
|  | 800 | 0.629 | 0.497 | 70 |
|  | 0 | 0.587 | 0.509 | 70 |
| Heating temperature 750° C. | 6000 | 0.553 | 0.513 | 60 |
|  | 800 | 0.528 | 0.528 | 60 |
|  | 0 | 0.434 | 0.554 | 60 |
| Non-annealed steel sheets | — | 0.342 | 0.633 | 60 |

NOTE:
B0.5 and W7/50 were measured in accordance with ASTM A596-69 (revised in 1979).

As can be seen from Table 1, the application of magnetic fields of 800 A/m or above in the process of cooling from immediately above the Curie point to 300° C. resulted in improved magnetizing feature as compared to the case of ordinary annealing without field application. The heating temperature of 850° C. grew the crystal grains of the material by 10 µm or so, which improved the magnetizing feature as compared to the case with the heating temperature of 750° C. When the magnetic field applied was 800 A/m in intensity, the effect of improving the magnetizing feature was somewhat less stable than in the case with 6000 A/m.

EXPERIMENTAL EXAMPLE 2

(Experimental Condition)

Used material: non-oriented electrical steel sheets (sample symbol: 35H230)

0.35 mm in thickness, no skin passed rolling, 100 µm in grain size

Sample dimensions: 80 mm in outer diameter, 60 mm in inner diameter

Heating temperature: 750° C.

Field application: in the process of cooling from 750° C. to 300° C.

Field intensity: 0 (nonmagnetic annealing), 6000, 12000 (A/m)

(Experimental Results)

Table 2 shows the experimental results.

TABLE 2

| Annealing condition | Field intensity (A/m) | B0.5 (T) | W7/50 (W/kg) | Grain size (µm) |
|---|---|---|---|---|
| Heating temperature 750° C. | 12000 | 0.749 | 0.522 | 100 |
|  | 6000 | 0.683 | 0.531 | 100 |
|  | 0 | 0.460 | 0.606 | 100 |
| Nonannealed steel sheets | — | 0.343 | 0.676 | 100 |

NOTE:
B0.5 and W7/50 were measured in accordance with ASTM A596-69 (revised in 1979).

As can be seen from Table 2, the use of the material having a greater grain size enhanced the effect of improving the magnetizing feature. The application of the 6000-A/m magnetic field and that of the 12000-A/m magnetic field did not show much difference in the effect of improving the magnetizing feature.

EXPERIMENTAL EXAMPLE 3

(Experimental Condition)

Used material 1: non-oriented electrical steel sheets (sample symbol: 50HS01)

ingredients of C: 0.002%, Si: 0.80%, Mn: 0.20%, and B: 0.004% skin passed rolling at a draft of 6%

0.50 mm in thickness, 15 µm in grain size

Used material 2: non-oriented electrical steel sheets (sample symbol: 50HS11)

ingredients of C: 0.002%, Si: 0.20%, Mn: 0.20%, Al: 1.00%, and P: 0.10% skin passed rolling at a draft of 6%

0.50 mm in thickness, 15 µm in grain size

Sample dimensions: 80 mm in outer diameter, 60 mm in inner diameter

Heating temperature: 810° C.

Field application: in the process of cooling from 810° C. to 300° C.

Field intensity: 0 (nonmagnetic annealing), 12000 (A/m)

(Experimental Results)

Table 3 shows the experimental results. For comparison, Table 3 also shows the experimental results on the material of the experimental example 2.

TABLE 3

| Sample | Annealing condition | BS (T) | B0.5 (T) | W7/50 (W/kg) | Grain size (µm) |
|---|---|---|---|---|---|
| 50HS11 | Magnetic annealing | 2.10 | 1.40 | 0.652 | 200 |
|  | Nonmagnetic annealing | 2.10 | 1.20 | 0.746 | 200 |
| 50HS01 | Magnetic annealing | 2.12 | 0.88 | 0.932 | 200 |
|  | Nonmagnetic annealing | 2.12 | 0.46 | 1.132 | 200 |

TABLE 3-continued

| Sample | Annealing condition | BS (T) | B0.5 (T) | W7/50 (W/kg) | Grain size (μm) |
|---|---|---|---|---|---|
| 35H230 | Magnetic annealing | 1.99 | 0.75 | 0.522 | 100 |
|  | Nonmagnetic annealing | 1.99 | 0.46 | 0.606 | 100 |

NOTE:
BS listed are saturation values of the magnetic induction in the B-H curves. BS, B0.5, and W7/50 were measured in accordance with ASTM A596-69 (revised in 1979).

FIG. 4 shows B-H curves representing the magnetizing feature graphically. In the chart, the curves (2) and (3) are the same as those in FIG. 1. The curves (4), (5), (6), and (7) show the results of the nonmagnetic annealing of the sample 50HS01, the magnetic annealing of the sample 50HS01, the nonmagnetic annealing of the sample 50HS11, and the magnetic annealing of the sample 50HS11, respectively. As can be seen from Table 3 and FIG. 4, even the sample 35H230 made of steel sheets without skin passed rolling, if given the magnetic annealing, achieved approximately 1.6 times of improvement in the magnetic induction B0.5 in lower magnetic fields and approximately 14% of reduction in the iron loss W7/50 with respect to the case of the nonmagnetic annealing. The sample 50HS01 made of skin-passed rolled steel sheets was lower than the sample 35H230 in Si content and thus inferior to the sample 35H230 in terms of magnetizing feature, whereas it had a large grain size and thus displayed a high effect of cooling in a magnetic field. The magnetic induction B0.5 of the sample 50HS01 in lower magnetic fields was higher than that of the sample 35H230. The sample 50HS11 made of Al-rich steel sheets, even with the nonmagnetic annealing, showed a greater magnetic induction B0.5 in low magnetic fields than the samples 35H230 and 50HS01 made of Si-rich steel sheets with the magnetic annealing did, and the magnetic induction B0.5 with the magnetic annealing was even greater. The foregoing confirms that the application of magnetic annealing to a core can improve the magnetizing feature, that the use of the electrical steel sheets given skin passed rolling in the final step provides a further improvement to the magnetizing feature as compared to the case where electrical steel sheets without skin passed rolling are used, and that the use of Al-rich electrical steel sheets achieves still a further improvement to the magnetizing feature.

EXPERIMENTAL EXAMPLE 4

In the experimental examples 1 to 3, the samples before and after the annealing were measured for the magnetic induction under a direct-current magnetic field, and for the iron loss at a frequency of 50 Hz. In the present experiment, the samples before and after annealing were subjected to alternating-current magnetic fields of different frequencies and measured for the saturation induction at that time, assuming the cases where the motor stator core of the present invention is applied to an electric vehicle motor.
(Experimental Condition)
  Used material: non-oriented electrical steel sheets (sample symbol: 35H250)
    ingredients of C: 0.002%, Si: 0.30%, Mn: 0.20%, and Al: 0.80%
    0.35 mm in thickness, no skin passed rolling, 150 μm in grain size
  Sample dimensions: 80 mm in outer diameter, 60 mm in inner diameter
  Heating temperature: 810° C.
  Field application: in the process of cooling from 810° C. to 300° C.
  Field intensity: 0 (nonmagnetic annealing), 8000 (A/m)
  Frequency of the exciting current: 50, 200, 400, 600, 1000 (Hz)
(Experimental Results)
  Table 4 shows the experimental results.

TABLE 4

|  |  | Frequency of exciting current (Hz) | | | | |
|---|---|---|---|---|---|---|
|  |  | 50 | 200 | 400 | 600 | 1000 |
|  |  | Rotational speed (min⁻¹) | | | | |
|  |  | 500 | 2000 | 4000 | 6000 | 10000 |
| Magnetic annealing | Saturation induction (T) | 1.54 | 1.39 | 1.17 | 1.08 | 0.39 |
|  | Output factor | 77.0 | 278 | 468 | 648 | 390 |
| Nonmagnetic annealing | Saturation induction (T) | 1.55 | 1.24 | 0.62 | 0.48 | 0.25 |
|  | Output factor | 77.5 | 248 | 248 | 288 | 250 |
| No annealing | Saturation induction (T) | 1.55 | 1.09 | 0.44 | 0.37 | 0.21 |
|  | Output factor | 77.5 | 218 | 176 | 222 | 210 |

NOTE:
The rotating speeds are for a 12-pole motor at the respective frequencies.
The saturation induction is a measurement under alternating-current magnetization at the respective frequencies.
The output factors are listed as the indexes of the motor outputs, each shown in terms of the product of the frequency and the saturation induction.

FIG. 5 is a graphical representation of Table 4. The broken lines show the saturation induction, and the full lines the output factors. The marks hollow circle, solid triangle, and solid circle represent magnetic annealing, nonmagnetic annealing, and no annealing, respectively.

As also shown in FIG. 1, when a direct-current magnetic field is applied to the non-annealed sample punched out of the non-oriented electrical steel sheets, the magnetic induction increases with increasing magnetizing force. Nevertheless, the magnetic induction reaches saturation at magnetizing forces of around 100000 A/m, with a saturation induction of approximately 2.0 (T). On the other hand, when an alternating-current magnetic field is applied, the saturation induction decreases with an increasing frequency of the exciting current because of the occurrence of anti-magnetizing force. Here, the rate of decrease of the saturation induction depends on the amount of strains remaining in the sample and the orientations of the domains. Stress-relief annealing reduces the residual strains to lower the rate of decrease of the saturation induction. In addition, magnetic annealing brings the orientations of the domains close to the direction of the magnetic field applied, and allows a further reduction in the rate of decrease of the saturation.

As shown in Table 4 and FIG. 5, the non-annealed sample and the nonmagnetic-annealed sample sharply drop in saturation induction when the frequency of the exciting current exceeds 200 Hz. The output factors, expressed in terms of the product of the frequency and the saturation induction, show little increase at frequencies of 200 Hz and above. In contrast, the saturation induction of the magnetic-annealed sample gently falls as the frequency of the exciting current increases. In particular, in the range from 400 to 600 Hz, which is the frequency range of the high frequency exiting current to be employed in electric vehicle motors, the sample provides output factors at least twice those of the non-annealed or nonmagnetic-annealed sample. This confirms that when the motor stator core according to the present invention is used for an electric vehicle motor, it is possible to provide motor power at least twice that of the electric vehicle motor using a conventional motor stator core, or to miniaturize the motor for the same power.

Up to this point, the configuration and experimental examples of the present invention have been described on the assumption that the motor stator core according to the present invention would be applied to an electric vehicle motor. Nevertheless, the motor stator core according to the present invention is not limited to electric vehicle motors in application, but is generally applicable to motors for use in lower magnetic fields with the effects of reduced iron loss and improved power.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A method of manufacturing a stator core to be used in a motor excited by a high-frequency current and driven in a magnetic field having a magnetic induction of no greater than 1.0 T, comprising:
   fabricating a stator core of non-oriented electrical steel sheets;
   heating the stator core to a temperature above a Curie point of the stator core; and
   cooling the heated stator core while applying a magnetic field thereto at least through a temperature range from a temperature above the Curie point to a temperature of 300° C., the magnetic field having a direction the same as a direction of excitation of a stator of the motor during operation of the motor.

2. The method of claim 1, wherein the heated stator core has a grain size of at least 100 μm during said applying of the magnetic field.

3. The method of claim 1, wherein said fabricating of the stator core comprises punching a plurality of ring-shaped layers out of non-oriented electrical steel sheets containing Si, and laminating the ring-shaped layers to form the stator core.

4. The method of claim 3, wherein said heating comprises heating the stator core to a temperature in a range of 750° C. to 850° C. so as to reduce any strains incurred during said punching.

5. The method of claim 1, wherein said applying of the magnetic field is stopped when the stator core reaches 300° C. during said cooling.

6. The method of claim 1, wherein said heating of the stator core comprises heating the stator core to a temperature sufficient to increase a size of the crystal grains in the stator core.

7. The method of claim 1, wherein said applying of the magnetic field comprises applying a magnetic field having an intensity in a range of 800 A/m to 12000 A/m.

8. The method of claim 1, wherein the stator core is to be used in a motor excited by a current in a range of 400 Hz to 600 Hz.

9. A method of manufacturing a stator core, comprising:
   fabricating said stator core of non-oriented electrical steel sheets;
   heating said stator core to a temperature above a Curie point of the stator core; and
   cooling the heated stator core while applying a magnetic field thereto at least through a temperature range from a temperature above the Curie point to a temperature of 300 degree C., the magnetic field having a direction the same as a direction of excitation of a stator of the motor during operation of the motor;
   exciting the stator core with high frequency current; and
   driving said stator core in a magnetic field having induction no greater than 1.0 T.

10. The method of claim 9, wherein the heated stator core has a grain size of at least 100 μm during said applying of the magnetic field.

11. The method of claim 9, wherein said fabricating of the stator core comprises punching a plurality of ring-shaped layers out of non-oriented electrical steel sheets containing Si, and laminating the ring-shaped layers to form the stator core.

12. The method of claim 11, wherein said heating comprises heating the stator core to a temperature in a range of 750° C. to 850° C. so as to reduce any strains incurred during said punching.

13. The method of claim 9, wherein said applying of the magnetic field is stopped when the stator core reaches 300° C. during said cooling.

14. The method of claim 9, wherein said heating of the stator core comprises heating the stator core to a temperature sufficient to increase a size of the crystal grains in the stator core.

15. The method of claim 9, wherein said applying of the magnetic field comprises applying a magnetic field having an intensity in a range of 800 A/m to 12000 A/m.

16. The method of claim 9, wherein said exciting of the motor comprises applying a current in a range of 400 Hz to 600 Hz to the motor.

* * * * *